Dec. 6, 1927.  
G. BURKE ET AL  
1,651,667
ADJUSTABLE REGULABLE KNIFE
Filed Feb. 3, 1927
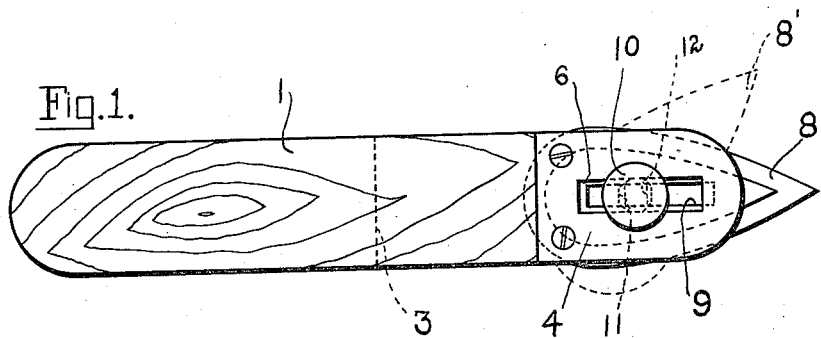
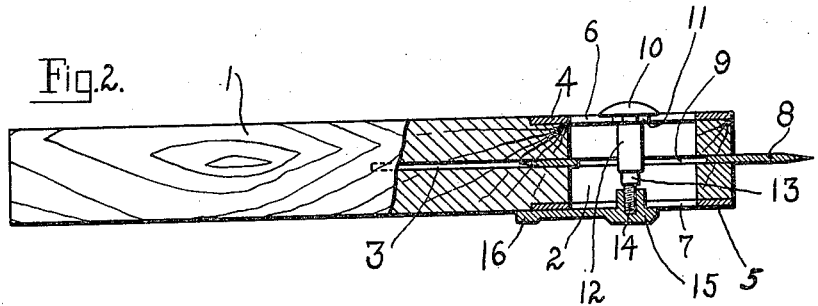
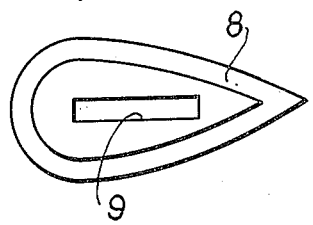
Inventor
Guillermo Burke and  
Manuel Acosta
By Emil Bönnelycke  
Attorney Patented Dec. 6, 1927.

1,651,667

UNITED STATES PATENT OFFICE.

GUILLERMO BURKE AND MANUEL ACOSTA, OF BUENOS AIRES, ARGENTINA.

ADJUSTABLE REGULABLE KNIFE.

Application filed February 3, 1927. Serial No. 165,654.

Our present invention relates to certain improvements in knives its main object being to provide an adjustable and regulable knife for cutting leather, sole, wood or any other object or material, said knife showing considerable advantages over those proposed or used heretofore for the same purpose.

The main feature of the present invention consists in using a blade sharpened all around its periphery, which is preferably circular at one end and pointed at the other, said blade being so fixed to a handle that its angular position relative thereto may be varied and regulated and also its longitudinal position with respect to said handle and to its longitudinal axis may also be adjusted.

The invention has further objects in view which will be clearly seen from the following description and which are particularly set forth in the appended claiming clauses.

In order that our present invention may be clearly understood and easily carried into practice, a preferred embodiment thereof has been shown in the appended drawings, wherein, Figure 1 is a plan view of the knife according to our present invention, Figure 2 is a side view thereof with the handle partially sectioned, and Figure 3 is a top view of the blade.

Similar characters of reference denote same or like parts throughout the said drawings.

In the embodiment shown 1 is a handle of any material and suitable size said handle having a substantially rectangular slot 2 near one of its ends. Normally thereto, the handle has also a slit 3 in which the blade 8 is lodged, said blade having a sharpened edge extending around its entire periphery and having any suitable conformation, as for instance, rounded at one end and pointed at the other end as shown in Fig. 3. The end of the handle corresponding to the elongated slot 2 is covered with metal plates 4 and 5, according to the nature of the material used for said handle, said plates being also provided with corresponding rectangular slots 6 and 7. The blade 8 has a central longitudinal slot 9 the width of which is somewhat less than the width of the slots 6 and 7. 10 is a bolt having a polygonally side sectioned or surfaced portion under its head as shown in 11, said portion adjusting itself in the slot 6 which ensures the immobility of the bolt in eight different angular positions. Below said portion the bolt has a square side sectional or surfaced portion 12 which passes through and corresponds to the slot 9 in the blade, which avoids all angular movements of said blade with respect to the bolt. In this form it is obvious that said bolt may slide longitudinally in the slot 6 whereby a longitudinal displacement of the blade with respect to the handle is obtained. Further, by slightly raising said bolt by allowing the square portion thereof to be in contact with the slot 9, it is possible to make angular displacements of the blade with respect to the longitudinal axis of the handle and further after the blade has been placed in the angular position required, it is possible to displace said blade along its own longitudinal axis. The bolt has preferably a rounded portion 13 and its end is screw threaded as shown in 14. A nut 15 of any suitable form may be fixed to the said bolt in order to tighten the parts together. Said nut may have a small handle 16 as shown or have any other suitable device in order to tighten and untighten it.

The working is obvious and does not require any further explanation.

It is obvious that many constructional and other changes may be introduced without departing from the scope of our present invention which has been clearly set forth in the appended claiming clauses.

Having now fully described and ascertained the nature of our present invention and in what manner the same is to be carried into practice, we declare that what we claim is:

1. A knife for the purposes set forth, consisting of a blade sharpened all around its edge and circular at one end and pointed at the other end, said knife being provided with a central longitudinal slot, and a handle having a central longitudinal slot in which the blade is lodged and a rectangular slot normal to the said longitudinal slot which permits the insertion and securing of a bolt having adjacent to its head a polygonal portion which adjusts itself in the slot of the handle and allows adjustment of said bolt in different angular positions, and a square sectioned portion which passes through the slot in the blade and allows the longitudinal displacement of the blade with respect to said bolt in any angular position thereof and of the bolt with respect to the handle, and a retaining nut for holding and pressing all parts together.

2. A knife for the purposes set forth, consisting of a blade sharpened all around its edge and circular at one end and pointed at the other end, said knife being provided with a central longitudinal slot, and a handle having a central longitudinal slot in which the blade is lodged and a rectangular slot normal to the said longitudinal slot which permits the insertion and securing of a bolt having adjacent to its head a portion having at least two side surfaces which adjusts itself in the slot of the handle and allows adjustment of said bolt in different angular positions, and a sectioned portion having at least two side surfaces which passes through the slot in the blade and allows the longitudinal displacement of the blade with respect to said bolt in angular positions thereof and of the bolt with respect to the handle, and a retaining nut for holding and pressing all parts together.

In testimony whereof we affix our signatures.

GUILLERMO BURKE.
MANUEL ACOSTA.